United States Patent [19]

Myers

[11] 3,911,767
[45] Oct. 14, 1975

[54] QUICK RELEASE TOOL HOLDER SUPPORT

[76] Inventor: Lester Alvin Myers, 3292 Cortese Drive, Los Alamitos, Calif. 90270

[22] Filed: Dec. 30, 1974

[21] Appl. No.: 537,185

[52] U.S. Cl. .................................................. 82/37
[51] Int. Cl.² ........................................ B23B 29/26
[58] Field of Search .................. 82/36 R, 36 A, 37

[56] References Cited
UNITED STATES PATENTS
| | | | |
|---|---|---|---|
| 3,513,735 | 5/1970 | Roberts | 82/36 R |
| 3,738,206 | 6/1973 | Parsons | 82/37 |

*Primary Examiner*—Leonidas Vlachos
*Attorney, Agent, or Firm*—William C. Babcock

[57] ABSTRACT

A quick release support that may be mounted on a machine such as a lathe or the like to maintain a tool holder in a desired initial position. The tool holder as is conventional with such devices removably supports a cutting tool or other tool for performing a machining operation. The present invention by a simple manual operation permits a tool holder and a machining tool held thereby to be initially adjusted as a unit to a desired position on a machine such as a lathe. The tool holder and machining tool may then by subsequent manual operations be removed from the support as a unit and replaced thereon as a unit, and with the assurance that the tool holder and machining tool when replaced as a unit will occupy their initial position relative to the support.

4 Claims, 5 Drawing Figures

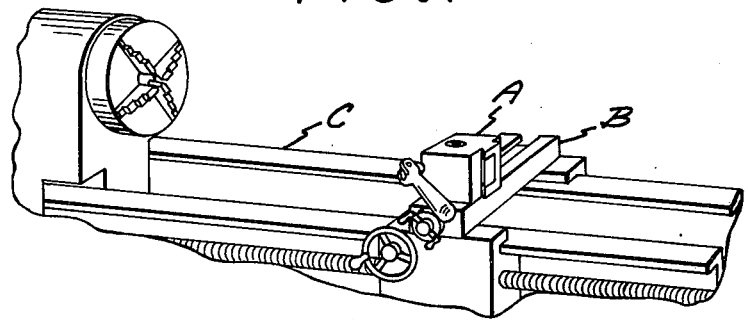
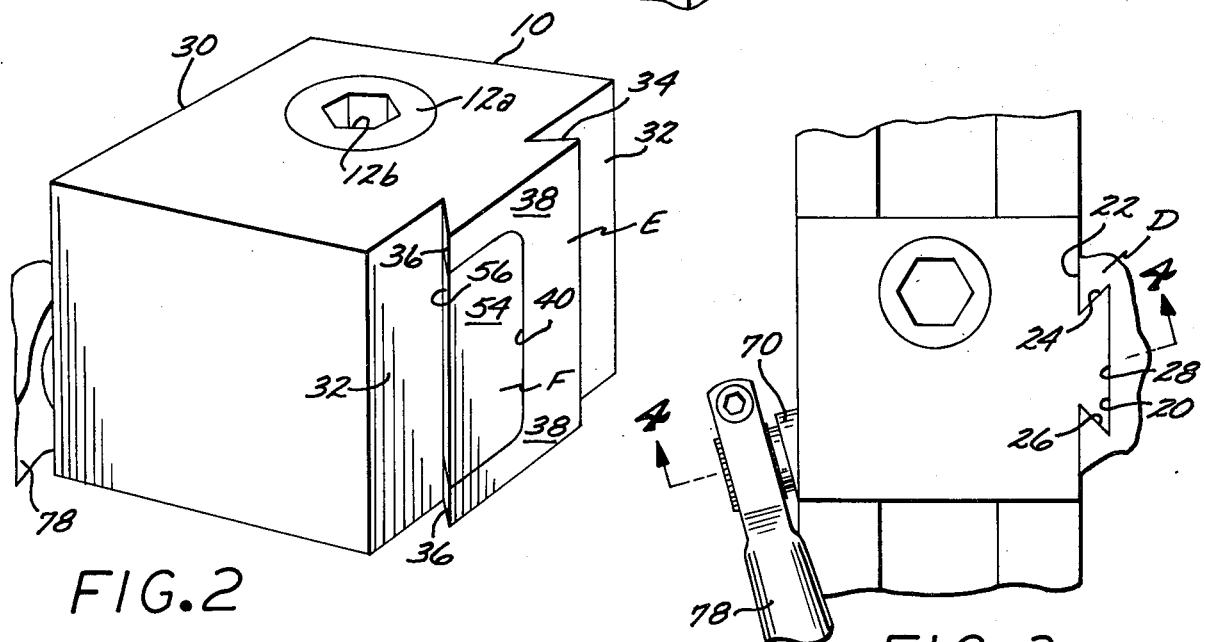
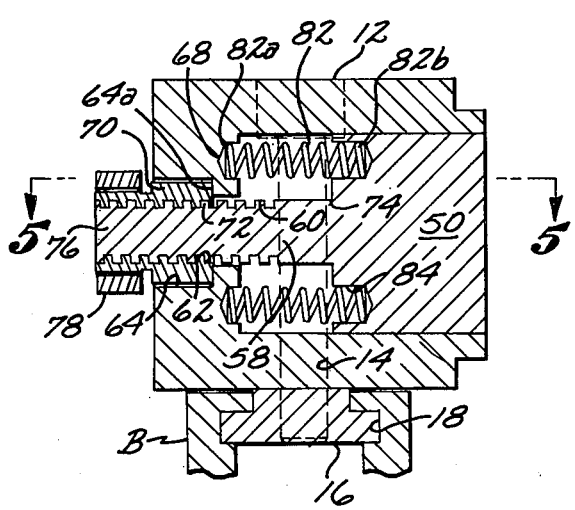
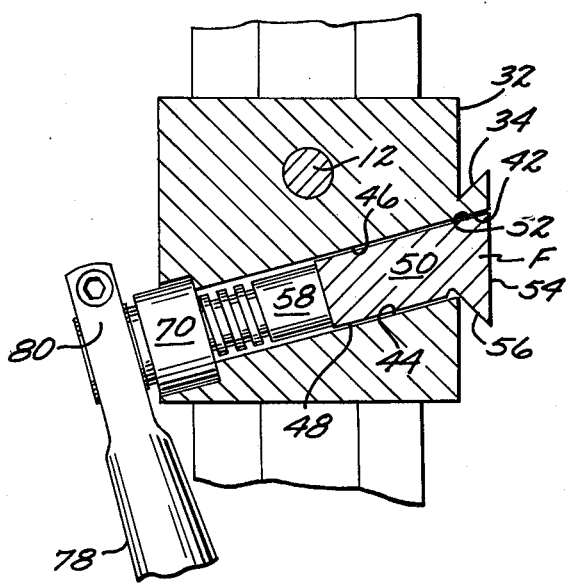

QUICK RELEASE TOOL HOLDER SUPPORT

BACKGROUND OF THE INVENTION

1. Field of the Invention

Quick release tool holder support.

2. Description of the Prior Art

Tool holder supports have been devised and used in the past that may be mounted on the machine such as a lathe or the like to initially dispose a tool holder in a desired initial position relative to the support. By manual operations the tool holder may be removed from the support and replaced thereon in the initial position.

Such tool holder supports have the operational disadvantages that they are cam operated, must be of an exacting and precise structure, are expensive and difficult to build, and are subject to malfunctioning if subjected to rough usage.

The primary purpose in devising the present invention is to provide a tool holder support of extremely simple structure, one that is simple and easy to use, is free of cams and surfaces that are difficult to machine, and one in which the locking head is screw actuated.

SUMMARY OF THE INVENTION

A quick release support that may be mounted in a desired position on a machine such as a lathe or the like to removably secure a tool holder in a desired initial position, and the support permitting the tool holder to be removed from the support and subsequently replaced thereon in the initial position.

The support includes a block that is rigidly secured to the machine. The support includes a vertically extending first surface that has a protuberance of dovetail, horizontal, transverse cross section projecting forwardly therefrom. A first portion of the protuberance is stationary relative to the block and secured thereto, and a second portion of the protuberance being defined by a locking head that is movable relative to the protuberance and is slidably situated in a slot formed therein.

The first portion of this protuberance is defined by a vertical, first end surface, two vertically spaced second end surfaces that angle towards one another, and a connecting surface extending therebetween the first and second end surfaces. The locking head, when in a first position, has the surfaces thereof flush with the connecting surface of the first portion and the second end surfaces thereof. The locking head is secured to the first end of a rigid body that is slidably movable in a cavity formed in the block, and this cavity being in communication with a bore formed in the block, which bore on the rearward end thereof develops into a recess of circular transverse cross section. The body has a rod extending rearwardly therefrom through the bore and into the recess, with the portion of the rod in the recess having threads formed thereon that engage internal threads formed in a sleeve that is rotatably supported in the recess. The sleeve has a handle secured thereto to permit the sleeve to be rotated, and in so doing moving the body and locking head inwardly and outwardly relative to the block.

When the locking head is in a first position relative to the protuberance, the protuberance and locking head may removably engage a groove of horizontal dovetail transverse cross section formed in the holder. By rotation of the handle and sleeve in an appropriate direction, the body and head are moved in a direction whereby the head pressure engages a portion of the tool holder that defines the groove, and by so doing causing the protuberance to be locked into pressure frictional contact with the surfaces of the tool holder defining the groove to support the tool holder in a desired initial position on the block. By reversing the direction of rotation of the sleeve, springs that are internally positioned within the blocks tend to force the locking head and body outwardly relative to the block, to release the locking heads from pressure contact with the tool holder, and permitting the tool holder to be lifted from the supports. By repeating the above described operations the tool holder may be sequentially placed on and removed from the tool holder with the assurance that each time the tool holder is mounted on the support it will be in the same position that it initially occupies thereon.

BRIEF DESCRIPTION OF THE DRAWINGS

FIG. 1 is a perspective view of a machine such as a lathe, with the quick release tool holder support mounted thereon;

FIG. 2 is an enlarged perspective view of the quick release tool holder support;

FIG. 3 is a top plan view of a tool holder support shown in FIG. 2;

FIG. 4 is a vertical cross sectional view of the tool holder support taken on the line 4—4 of FIG. 3; and FIG. 5 is a transverse cross sectional view of the tool holder support taken on the line 5—5 of FIG. 4.

DESCRIPTION OF THE PREFERRED EMBODIMENT

The quick release tool holder support A is illustrated in FIG. 1 as being mounted on the carriage B of a conventional lathe C. The tool support A is not limited to use on lathes but may be used equally well on other machine tools when it is desired to sequentially remove tool holders from the machine and replace the tool holder in the position that they initially occupied.

The tool holder support A as may best be seen in FIGS. 2 to 5 inclusive includes a block 10 of rigid material such as steel or the like that has a bolt 12 extending downwardly through a bore 14 formed therein, to engage a nut 16 that slidably engages a recess 18 formed in the carriage B. The bolt includes a head 12a as shown in FIG. 2 that may be rotated by use of a suitable tool (not shown) when the tool is in engagement with a hexagonal recess 12b formed in the head 12a. By rotating the head 12a the bolt may be tightened to force the nut 16 into frictional gripping contact with the carriage B to hold the block 10 in a desired position therein.

The tool holding member D as may be seen in FIG. 3 is of conventional design and is of the type in which a vertically extending groove 20 of transverse dovetail cross section is formed that extends inwardly from a first vertical face 22 thereof. The groove 20 is intermediately positioned between the ends of the first face 22 and is defined by first and second spaced vertically extending elongate end faces 24 and 26 that angle away from one another, and in the inward ends thereof having a connecting face 28 extending therebetween. The block 10 includes a first vertical surface 32 as best seen in FIG. 2 from which a protuberance E projects horizontally from a position intermediate the vertical ends of the first surface. The protuberance E is of horizontal transverse, dovetail cross section and is of slightly lesser width and depth than that of the groove 20 to permit the groove 20 to slidably engage the protuberance.

The protuberance E is defined by a first end surface 34 and two vertically spaced second end surfaces 36 as shown in FIG. 2, with the first and second end surfaces having a vertically connecting surface 38 extending therebetween. The protuberance E has a vertically elongate rectangular slot 40 formed thereon adjacent to second end surfaces 36 and in communication with the vertical spaces between end surfaces 36.

The slot 40 is partially defined by a first vertical wall 42 as shown in FIG. 5 that is angularly directed relative to the first surface 32. A cavity 44 of rectangular transverse cross section is formed in the block 10 and is partially defined by second and third vertical laterally spaced walls 46 and 48 as shown in FIG. 5, with the second wall 46 and the first wall 42 lying on the same vertical plane.

A rigid elongate body 50 of rectangular transverse cross section and of lesser length than the cavity 44 is slidably supported in the latter as can best be seen in FIG. 5. The body 50 has a first end that develops into a rigid locking head F as may best be seen in FIGS. 2 and 5, and the head F when in a first position as shown in FIG. 2 serving to complete the protuberance E that engages the groove 20 in the tool holder D. The rigid head F when in the first position as shown in FIG. 5 has a first side 52 that is parallel to the first wall 42 and in slidable abutting contact therewith. The head F includes a second side 54 that lies on the same vertical plane as the connecting surface 38 of protuberance E. The head F also includes a third vertical side 56 that as may best be seen in FIGS. 2 and 5 lies on the same vertical plane as the two second end surfaces 36.

The body 50 has a rod 58 of circular transverse cross section extending rearwardly therefrom as may be seen in FIG. 4. The rod 58 adjacent the free end thereof has external threads 60 formed thereon. The rod 58 is of sufficient length as to extend longitudinally through a bore 62 formed on the block 10, and through a recess 64 of circular transverse cross section formed on the rearward portion of the block 10. The bore 62 and recess 64 are in coaxial alignment and at their junction define an annulus shaped body shoulder 68 the purpose of which will later be explained.

A cylindrical sleeve 70 is rotatably supported in the recess 64, and the sleeve having internal threads 72 formed thereon that engage the spaces between the threads 60 on the rod 58. The first end portion 74 of the rod 58 as shown in FIG. 4 is rigidly secured to the body 50 and formed as a part of the body. A second outwardly disposed end portion 76 of the rod 58 has an elongate handle 78 secured thereto by conventional means 80. Compressed helical springs 82 are disposed within the confines of the block 10, and have first ends 82a thereof in abutting contact with the shoulder 68 and second ends 82b in abutting contact with the body 50. The second end parts 82b of the springs are preferably disposed in recesses 84 formed in the body 50. The springs, due to being compressed at all times urge the body 50 and locking head F towards the protuberance E and in so doing maintain the sleeve 70 in rotatable sealing contact with an annulus shaped surface 64a that partially defines the recess 64. In FIG. 5 it will be seen that the locking head 54, body 50, rod 58 and sleeve 70 are coaxially aligned at an angle relative to the first surface 32.

When it is desired to use the tool holder support A, the handle 78 is rotated to move the locking head F to the first position shown in FIG. 5 where the groove 20 of tool holder D may slidably engage the protuberance E and be disposed at a desired height thereon. The handle 78 is then rotated in an appropriate direction to move the locking head F towards the sleeve 70. As such movement of the locking head F takes place, the third wall 56 of the head F pressure contacts the second end face 26 of the tool holder D to force the tool holder and the protuberance E into frictional gripping contact to maintain the tool holder at a desired position on the support A. Due to the angular positioning of the rod 58, the longitudinal force exerted on the head is in such a direction that maximum frictional pressure contact is exerted on the first and second end surfaces 24 and 26 of the tool holder D, to frictionally grip the tool holder, and maintain the tool holder in a fixed desired position in the support A. When it is desired to disengage the tool holder D the above described operation is reversed, with the head F then moving forward towards the tool holder A to relieve the pressure contact between the head F and the tool holder and allow the latter to be slid to the desired position on the support A. Positioning of the tool holder A at a desired initial position on the block 10 may be by stop means (not shown) or horizontal alignment lines on the block 10 and tool holder D (not shown).

The use and operation of the invention has been described previously in detail and need not be repeated.

I claim:

1. A quick release support that may be mounted on a desired position on a machine such as a lathe to removably secure a tool holding member in a fixed initial position relative to said support, said tool holding member being of the type in which a vertically disposed groove of transverse dove tail cross section extends inwardly from a first vertical face of said tool holding member, said groove being intermediately positioned between the ends of said first vertical face and defined by first and second spaced vertically extending elongate end faces that angle away from one another and have a vertical connecting face extending between the most inwardly disposed ends thereof, said quick release support including a block of rigid material that is secured in said desired position on said machine and that has a first vertical surface that has a vertical protuberance extending horizontally from a position intermediate the ends thereof, said protuberance of transverse dove tail cross section and of slightly lesser width and depth than that of said groove, said protuberance defined by a first end surface and two vertically spaced second end surfaces, said first and second end surfaces having a vertical connecting surface extending therebetween, said protuberances having a vertically extending rectangular slot therein adjacent said second end surfaces and in communication with a vertical space between said second end surfaces, said slot partially defined by a first vertical wall that is angularly disposed relative to said first surface, a cavity of rectangular transverse cross section in said block that is partially defined by second and third vertical, laterally spaced walls, said second wall and first wall lying in the same vertical plane, said quick release support block including:

a. a rigid elongate body of rectangular transverse cross section of less length than said cavity that is slidably supported therein said body having first and second ends;

b. a rigid head supported from said first end of said body, said rigid head when said body is in a first position in said cavity having a first side that is parallel to said first wall and in abutting contact therewith, a second side that lies in the same vertical plane as said connecting surface, and a third vertical side that lies in the same vertical plane as said two second end surfaces;

c. a rod that extends outwardly from said second end of said body, said rod having threads on at least the portion adjacent the free end thereof, said rod of sufficient length as to extend longitudinally through a bore and a recess formed in said block that are coaxially aligned with said cavity, said bore and recess at their junction defining an annulus shaped body shoulder of substantial area;

d. a cylindrical sleeve rotatably supported in said recess, said sleeve having internal threads that engage said threads on said rod, said sleeve having first and second ends, said first end in rotatable sliding contact with said body shoulder, and said second end outwardly disposed from said block;

e. a handle secured to said second end of said sleeve; and f. spring means that at all times tend to maintain said first end of sald sleeve in contact with said body shoulder, with said handle and sleeve when rotated in an appropriate direction moving said body and head in a direction that said third side of said head pressure engages said second end face of said groove in said tool holding member and by so doing brings said first and second end faces and connecting face into pressure contact with said first and second end surfaces and connecting surface of said protuberance to removably support said tool holding member from said block and in said desired initial position thereon, and said support permitting said tool holder to be removed therefrom and replaced thereon in said initial position.

2. A quick release support as defined in claim 1 in which said handle is of elongate shape and extends outwardly from said sleeve at an acute angle to said first surface of said block.

3. A quick release support as defined in claim 1 in which said spring means are a plurality of compressed helical springs disposed in spaced relationship within said cavity, said springs having first and second ends with said first ends disposed in first recesses formed in said block and said second ends disposed in recesses formed on said rigid body.

4. A quick release support as defined in claim 1 in which said head, body, rod and sleeve are so angularly disposed relative to said block that when said sleeve is rotated to move said locking head inwardly said locking head follows the surface defining said protuberance and said groove in said tool holder into substantially full pressure frictional engaging contact with one another to hold said tool holder at a desired position in said protuberance and block.

* * * * *